United States Patent
Alfano et al.

(10) Patent No.: US 8,385,375 B2
(45) Date of Patent: Feb. 26, 2013

(54) P-ELEMENT DOPED LASER MEDIUM APPARATUS AND METHOD

(76) Inventors: Robert R. Alfano, Bronx, NY (US); Alexei Bykov, Bronx, NY (US); Mikhail Sharonov, Bronx, NY (US)

( * ) Notice: Subject to any disclaimer, the term of this patent is extended or adjusted under 35 U.S.C. 154(b) by 55 days.

(21) Appl. No.: 13/026,869

(22) Filed: Feb. 14, 2011

(65) Prior Publication Data
US 2011/0206078 A1 Aug. 25, 2011

Related U.S. Application Data

(60) Provisional application No. 61/282,451, filed on Feb. 12, 2010.

(51) Int. Cl.
*H01S 3/30* (2006.01)

(52) U.S. Cl. ............ 372/6; 372/39; 372/40; 372/44.011

(58) Field of Classification Search .............. 372/6, 39, 372/40
See application file for complete search history.

(56) References Cited

U.S. PATENT DOCUMENTS

| | | | |
|---|---|---|---|
| 4,371,965 A * | 2/1983 | Lempicki et al. ............... | 372/40 |
| 2005/0175289 A1 * | 8/2005 | Kitabayashi et al. ........... | 385/50 |

* cited by examiner

*Primary Examiner* — Dung Nguyen
(74) *Attorney, Agent, or Firm* — The Farrell Law Firm, P.C.

(57) ABSTRACT

A glass composition for use as a laser medium, a method for producing the glass composition, and a laser apparatus including the glass composition are provided. The glass composition includes a host glass; a 3p component having a concentration of about 5 mole percent to about 10 mole percent; and at least one of a 6p component having a concentration of about 1 mole percent to about 5 mole percent and a 5p component having a concentration of about 1 mole percent to about 5 mole percent.

22 Claims, 9 Drawing Sheets

P-ELEMENT DOPED LASER MEDIUM APPARATUS AND METHOD

PRIORITY

The present invention claims priority from U.S. Provisional Patent Application Ser. No. 61/282,451, filed Feb. 12, 2010, the entire contents of which are incorporated herein by reference.

BACKGROUND OF THE INVENTION

1. Field of the Invention

The present invention is directed to glass composition for use as a laser medium, a method for producing the glass composition, and a laser apparatus including the glass composition.

2. Description of the Related Art

FIG. 1 illustrates a conventional laser apparatus. Referring to FIG. 1, a laser apparatus 100, which is used to emit light for various purposes, typically includes a pumping source 110 for providing energy, a laser medium 120 that receives the energy provided by the pumping source 110, and two reflective elements 130 and 140 to provide feedback of light output from the laser medium. The reflective elements include a fully reflective back mirror 130 and a partially reflective front mirror 140, such that the front mirror 140 transmits a portion of the light through the front mirror as an output of the laser apparatus.

The laser medium 120 may be constructed of various materials, the properties of which affect the operation of the laser apparatus 100, as well as properties of light emitted from the laser apparatus 100, such as bandwidth of the emitted light. Variations in properties of light emitted from the laser apparatus 100, such as a frequency range (i.e., bandwidth), can impact suitability of the use of the emitted light for various specific purposes.

Various fields of science and engineering, in particular, chemistry and telecommunications, require broadband laser sources and optical amplifiers in the form of fibers and waveguides. The Near InfraRed (NIR) spectrum, which ranges from 1100 nm to 1600 nm, is used for wideband operations. Recently, tunable laser action has been achieved using Cr4+ and Cr3+ doped crystals. However, even with these developments, there is still a further need for improved laser medium constructions and compositions in order to produce emitted light even better suited to these and other various purposes.

SUMMARY OF THE INVENTION

The present invention has been made to address at least the above problems and/or disadvantages and to provide at least the advantages described below.

According to an aspect of the present invention, a glass composition for use as a laser medium is provided. The glass composition includes a host glass; a 3p component having a concentration of about 5 mole percent to about 10 mole percent; and at least one of a 6p component having a concentration of about 1 mole percent to about 5 mole percent and a 5p component having a concentration of about 1 mole percent to about 5 mole percent.

According to another aspect of the present invention, a laser apparatus is provided. The laser apparatus includes a laser medium comprising a host glass, a 3p component having a concentration of about 5 mole percent to about 10 mole percent, and at least one of a 6p component having a concentration of about 1 mole percent to about 5 mole percent and a 5p component having a concentration of about 1 mole percent to about 5 mole percent; optical means for exciting the laser medium to emit optical radiation; and an optical resonant cavity for supporting coherent radiation emitted by the laser medium.

According to another aspect of the present invention, a method for manufacturing a glass composition including a host glass, a 3p component having a concentration of about 5 mole percent to about 10 mole percent, and at least one of a 6p component having a concentration of about 1 mole percent to about 5 mole percent and a 5p component having a concentration of about 1 mole percent to about 5 mole percent is provided. The method includes heating the host glass to a first predetermined temperature for a first period of time, mixing a powder including the 3p component and the at least one of the 5p component and the 6p component with the heated host glass into a glass/powder mixture, heating the glass/powder mixture to a second predetermined temperature for a second period of time, and cooling, after heating, the glass/powder mixture.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF EMBODIMENTS OF THE PRESENT INVENTION

Figure 1:
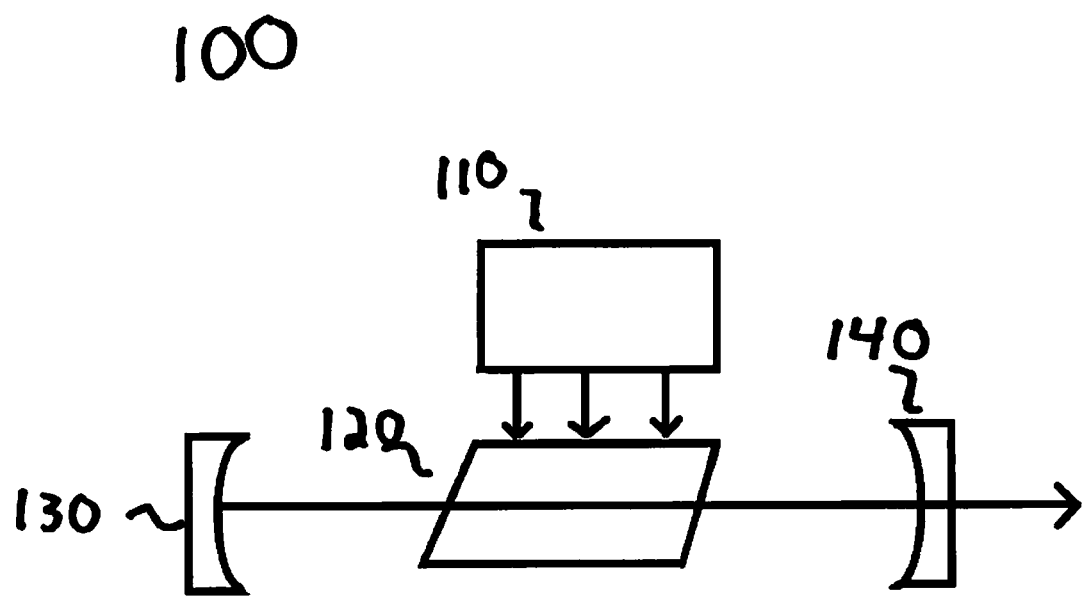
FIG. 1 is a diagram illustrating a conventional laser apparatus.

Embodiments of the present invention are described in detail with reference to the accompanying drawings. Similar components are designated by similar reference numerals although they are illustrated in different drawings. Detailed descriptions of constructions or processes known in the art may be omitted to avoid obscuring the subject matter of the present invention. Terms used herein are defined based on functions in the present invention and may vary according to users, operators' intention or usual practices. Therefore, the definition of the terms should be made based on contents throughout the specification.

According to embodiments of the present invention, laser mediums, which may be in the form of glass fibers, waveguides, and laser rods, may contain dopants including one or more 3p elements in combination with 4p, 5p, and/or 6p elements within a glass host. The glass host may be any of a plurality of glass host materials including silicate, germinate, or a phosphate glass host, but embodiments of the present invention are not limited to these specific example.

The herein, the terms "3p", "4p", "5p", and "6p" refer to elements/ions included in the third, fourth, fifth, and sixth rows of the periodic table. With regard to embodiments of the present invention, 3p elements used in laser mediums include Aluminum (Al), Silicon (Si), and Phosphorous (P); 4p elements include Gallium (Ga), Germanium (Ge), Arsenic (As), and Selenium (Se); 5p elements include Indium (In), Tin (Sn), Antimony (Sb), Tellurium (Te), and Iodine (I); and 6p elements include Thallium (Tl), Lead (Pb), Bismuth (Bi), and Polonium (Po). Each of these listed elements, when included as dopants in the laser medium, may be present in the form of various compounds, such as compounds including Oxygen (O), for example, $Al_2O_3$, $SiO_2$, and $P_2O_5$. Al may also be present as a dopant in the form of Aluminum Fluoride $AlF_3$.

Laser mediums according to embodiments of the present invention, which include 4p, 5p, and/or 6p elements in combination with 3p elements in silicate, germinate, and/or phosphate hosts, may be included in a laser apparatus, such that the laser apparatus is tunable to a Near InfraRed (NIR) spectrum ranging from about 1000 nm to about 1600 nm. Within this bandwidth, such laser emissions may be used for various applications including telecommunication, chemical, and biological applications, for example.

The 5p and 6p elements with 3p elements within the laser medium may serve as active laser complexes for step index and photonic crystal fiber lasers, waveguide lasers and rod/slab lasers for Continuous Wave (CW), pulsed (nsec, psec, and fsec) operation within the NIR spectrum from about 1100 to 1600 nm.

The long lifetime of metastable levels of p class elements provide favorable properties for use in laser mediums, including fiberoptics and waveguide lasers and amplifiers. According to embodiments of the present invention host glasses doped with 4p, 5p and/or 6p elements in combination with 3p elements, such as Al as a further dopant, are suitable for various types of lasers in various modes of operations, including CW, pulsed, and mode locked operation, in order to generate tunable CW, nanosecond (ns), picosecond (ps), and femtosecond (fs) modes of operation.

The 4p, 5p, and 6p elements, when used as dopants with 3p elements, such as Al, for example, are suitable for wideband lasers in the form of fibers, waveguides, slabs and rods, within a laser cavity, in order to produce light within the NIR spectrum.

As stated above, the doped glass hosts may be any of various types including germanate, silicate and phosphate types. In particular, the phosphate glasses may be used to allow for a relatively large dopant concentration.

A process for preparing a laser medium including a glass host as described above, according to embodiments of the present invention, is described as follows.

A glass host, such as a germinate ($GeO_2$) glass host, for example, doped with 1 mole percent PbO, SnO, or $Sb_2O_3$ in combination with 12 mole percent $AlF_3$, may be prepared by heating the glass host within a Platinum (Pt)-crucible, or a muffle furnace, for example, at 1450° C. for 1 hour, followed by quenching the glass onto a copper plate. The glass host may be melted within an air and nitrogen atmosphere. In particular, fluorescence is exhibited through doping the host glass with various p elements such as Bi and Pb, for example, when the host glass is synthesized in both air and nitrogen atmospheres, for example. Meanwhile, glass hosts doped with other p elements such as Sb and Sn, for example, exhibit fluorescence, when the melting and doping is performed in a nitrogen-only atmosphere.

$GeO_2$-glass samples doped with 1 mole percent $Bi_2O_3$ (or PbO, $In_2O_3$, $SnO_2$, $Sb_2O_3$, $TeO_2$) and co-doped with 12 mole percent $AlF_3$ may be synthesized according to various casting techniques. Various particular glass hosts and p-elements (or particular compounds including a particular p-element), such as those described above, may be selected for inclusion in the doped glass according to various properties. For example, a $GeO_2$-based glass composition has a lower melting point compared with traditional silica. Similarly, $AlF_3$ may be chosen as a source of Al in place of other sources of Al having a higher melting point, such as $Al_2O_3$, as may be preferable due to various considerations. For example, use of a $GeO_2$-based glass composition with $AlF_3$ provides an opportunity to study optical center formation while using a glass preparation temperature from as low as 1100° C.

A doped glass host composition according to embodiments of the present invention may be prepared through a glass fabrication procedure that includes a two-step heat treatment. For example, $GeO_2$ (at 99.999% purity) and reagent grade $AlF_3$, $Bi_2O_3$, PbO, $In_2O_3$, $SnO_2$, $Sb_2O_3$, $TeO_2$, may be used to perform synthesis in air and nitrogen atmospheres. A first heat treatment may be performed at 950° C. for 20 hrs to provide initial solid state sintering of a thoroughly mixed initial charge. After sintering, the dopant materials may ground and mixed in an alumina mortar. A resultant powder may be placed in a Pt-crucible and heated again up to ~1450° C. for 1 hour, followed by quenching onto a copper plate. After quenching, the doped glass may be polished for further spectroscopic measurements.

In addition to the example provided above, other materials may be used as a glass host according to embodiments of the present invention. For example, glasses based on $SiO_2$ and/or $P_2O_5$ may be used as a glass host with an $Al_2O_3$ dopant in order to yield similar broadband emission in the NIR spectrum ranging from about 1100 nm to about 1600 nm.

According to embodiments of the present invention, p fiber lasers (i.e., laser apparatus using a doped glass host composition according to embodiments of the present invention, as described above, for example) may be used to replace commonly used narrow line lasers, such as Erbium (Er) (6s/4f) lasers used for a 1530 nm to 1600 nm range and Thulium (Tm) (6s/4f) lasers used for a 1450 nm to 1540 nm range, for communications as well as other applications in chemistry and biology.

Use of different host glasses according to embodiments of the present invention shift an emission spectrum for a given p element dopant with Al. For example for $GeO_2$ and $P_2O_5$-based glass hosts enable an emission from about 1100 nm to about 1500 nm. 6p-element (e.g., Bi, Pb); 5p-element (e.g., Sb, Sn, In, Te) doped glasses, further doped with Al, have similar excitation-emission characteristics within 4 major bands, as shown in FIG. 2, whose position differ slightly in NIR.

The 5p and 6p components, in addition to the 5p and 6p elements/compositions, respectively, may further include a saturable absorber for generating ps and fs pulses. The saturable absorber may include any of various saturable absorption materials, including, but not limited to an alloyed semiconductor for performing absorption at around 1200 nm and/or a YAG saturable absorber.

Figure 2:
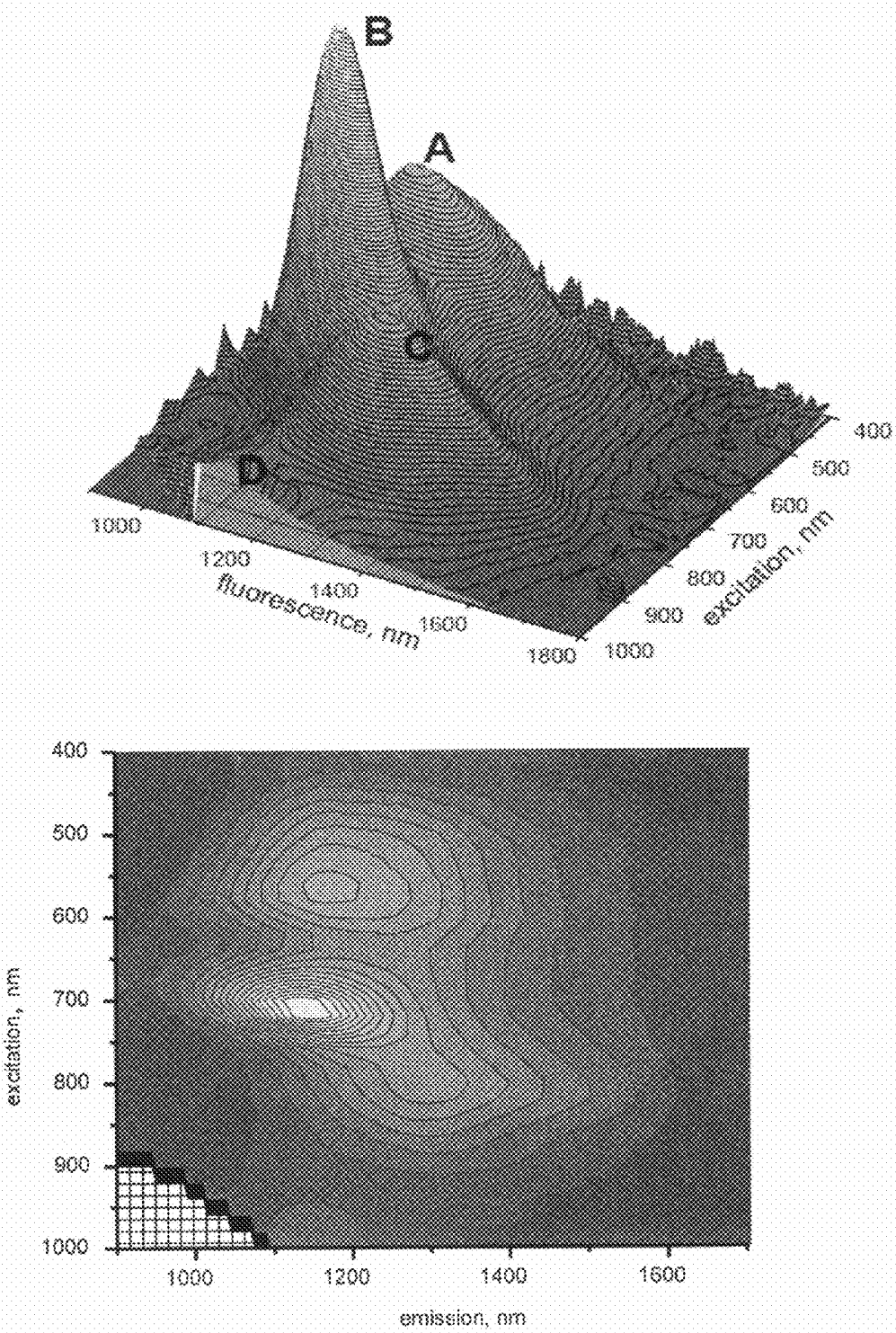
FIG. 2 are contour diagrams illustrating a plot of an example of fluorescence vs. excitation for Bi, Pb, Sb, Sn, Te dopants further doped with an Al co-dopant in silicate or germanate glass hosts according to an embodiment of the present invention.

FIG. 2 is a contour diagram illustrating a plot of an example of fluorescence vs. excitation for Bi, Pb, Sb, Sn, Te dopants further doped with an Al co-dopant in silicate or germanate glass hosts according to an embodiment of the present invention.

Referring to FIG. 2, for Bi-doped glass these bands are located at (560 nm, 1170 nm) (A-band); (710 nm, 1140 nm) (B-band); (800 nm, 1280 nm) (C-band) and (1000 nm, 1140 nm) (D-band), where the first number denotes an excitation wavelength and the second is an emission wavelength. Excitation/emission bands of other p-elements are listed in Table 1, as follows:

TABLE 1 p-M doped glasses

| Sample | | A | | B | | C | | D | |
|---|---|---|---|---|---|---|---|---|---|
| M oxide | AlF$_3$ mol. % | Position | Ratio to B | Position | Ratio to B | Position | Ratio to B | Position | Ratio to B |
| Bi | 0.75 | (560, 1170) | 0.45 | (710, 1140) | 1 | (800, 1280) | 0.18 | (1000, 1140) | 0.08 |
|  | 3 |  | 0.62 |  | 1 |  | 0.37 |  | 0.14 |
|  | 12 |  | 0.80 |  | 1 |  | 0.62 |  | 0.17 |
|  | 24 |  | 0.53 |  | 1 |  | 0.37 |  | 0.16 |
| Pb | 12 | (540, 1120) | 0.85 | (710, 1110) | 1 | (820, 1260) | 0.12 | (1000, 1120) | 0.16 |
| Sb | 12 | (550, 1110) | 0.62 | (700, 1110) | 1 | (800, 1270) | 0.32 | (1000, 1110) | 0.06 |
| Sn | 12 | (540, 1120) | 0.42 | (710, 1105) | 1 | (800, 1260) | 0.25 | (1000, 1110) | 0.11 |

NIR emission may be performed through the use of host glasses doped with 6p elements (e.g., Pb) and 5p elements (e.g., Sb and Sn) and further doped with 3p elements, such Al, as listed in Table 1. Further, although not shown in Table 1, host glasses may also be doped with 4p elements (e.g., Ga, Ge, and As) and further doped with Al, in order to provide lasing.

Models based on electronic states of dopants do not explain similarity of optical properties for elements with huge differences in spin-orbit constants (e.g., similarity of optical properties) when using 6p and 5p dopants. Further, the 4 major bands shown on excitation-emission plots, such as in FIG. 2, do not necessarily belong to the same optical center. Point defects or localized states may be caused by the presence of 6p and 5p ions, resulting in near infrared emission when a glass host is doped with these materials in combination with a 3p element such as Al.

Figure 3:
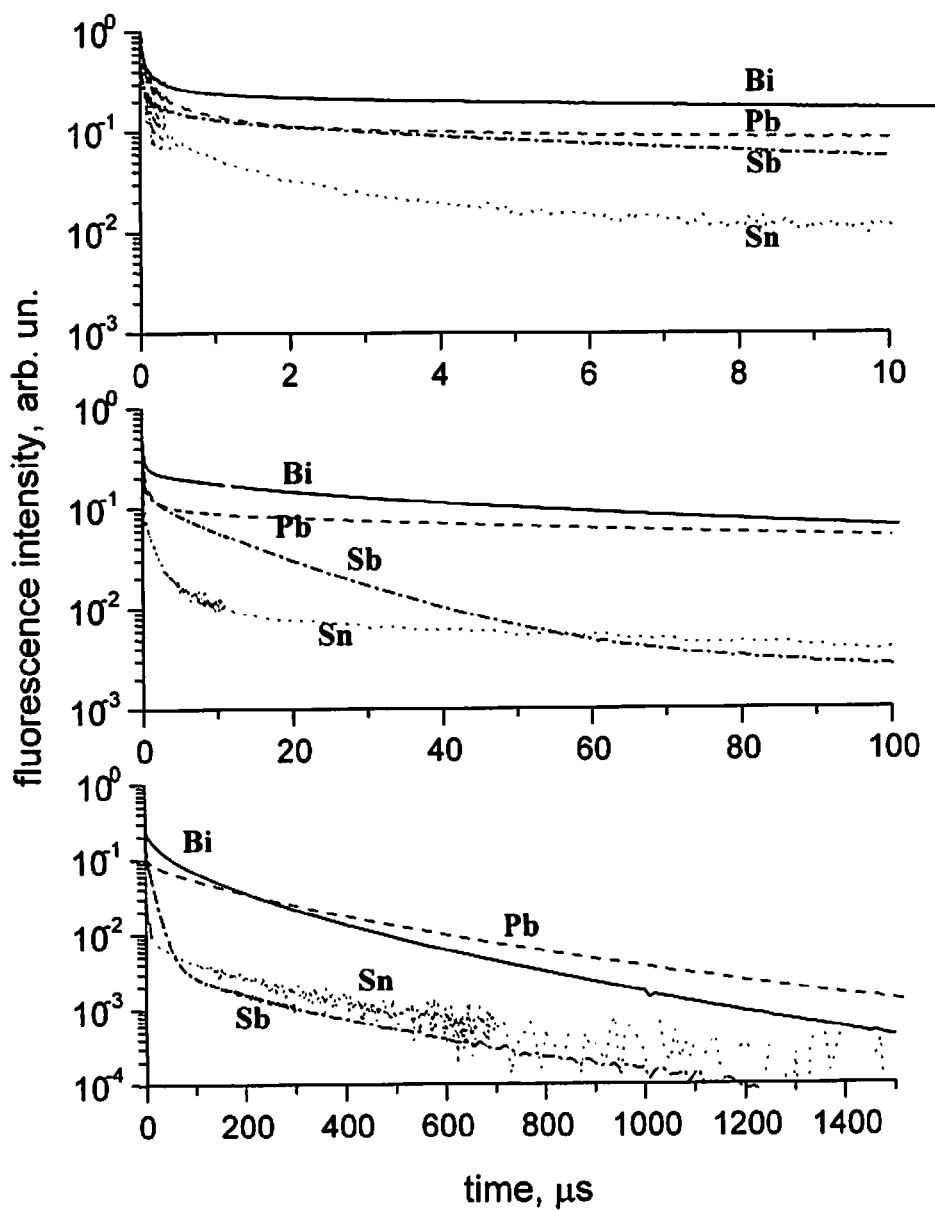
FIG. 3 is a diagram illustrating decays in Pb-, Sb- and Sn-doped germanate samples co-doped with Al according to an embodiment of the present invention.

FIG. 3 is a diagram illustrating decays in Pb-, Sb- and Sn-doped germanate samples co-doped with Al according to an embodiment of the present invention.

In the example illustrated in FIG. 3, the decays are normalized to the unity intensity at t=0 for all traces. Referring to FIG. 3, at the latest stage the decays are similar, while at the initial and intermediate stages of the decay there are significant differences, especially for Sb and Sn doped samples. Relative intensity of long-lived fluorescence in Sb and Sn-doped samples is significantly lower compared to Bi and Pb-doped samples. These lifetimes shows that these p-elements are suitable for lasers and amplifiers in fibers, waveguides and rods. For examples, the spectral position of p-elements for excitation and emission peaks are listed in Table 1. Various peaks can lase over the NIR suitable for fibers (single, microstructure) and waveguides.

In addition to the examples described above with reference to FIGS. 2-3, other p elements such as Thallium in the 6p class and Ga, Ge, As and Se in the 4p class may be used as dopants in the laser host glasses along with 3p elements such as Al, Si and P, in accordance with embodiments of the present invention. Table 2 below illustrates the electron configuration of such elements:

TABLE 2

| | element | At No | M | | | N | | | | O | | | | P | | | |
|---|---|---|---|---|---|---|---|---|---|---|---|---|---|---|---|---|---|
| nP | | | 3s | 3p | 3d | 4s | 4p | 4d | 4f | 5s | 5p | 5d | 5f | 6s | 6p | 6d | 6f |
| 5p | In | 49 |  |  |  |  |  |  |  | 2 | 1 | 0 | 0 |  |  |  |  |
|  | Sn | 50 |  |  |  |  |  |  |  | 2 | 2 | 0 | 0 |  |  |  |  |
|  | Sb | 51 |  |  |  |  |  |  |  | 2 | 3 | 0 | 0 |  |  |  |  |
|  | Te | 52 |  |  |  |  |  |  |  | 2 | 4 | 0 | 0 |  |  |  |  |
|  | In | 53 |  |  |  |  |  |  |  | 2 | 5 | 0 | 0 |  |  |  |  |
| 6p | Tl | 81 |  |  |  |  |  |  |  |  |  |  |  | 2 | 1 | 0 | 0 |
|  | Pb | 82 |  |  |  |  |  |  |  |  |  |  |  | 2 | 2 | 0 | 0 |
|  | Bi | 83 |  |  |  |  |  |  |  |  |  |  |  | 2 | 3 | 0 | 0 |
|  | Po | 84 |  |  |  |  |  |  |  |  |  |  |  | 2 | 4 | 0 | 0 |
| 3p | Al | 13 | 2 | 1 | 0 |  |  |  |  |  |  |  |  |  |  |  |  |
|  | Si | 14 | 2 | 2 | 0 |  |  |  |  |  |  |  |  |  |  |  |  |
|  | P | 15 | 2 | 3 | 0 |  |  |  |  |  |  |  |  |  |  |  |  |
| 4p | Ga | 31 |  |  |  | 2 | 1 | 0 | 0 |  |  |  |  |  |  |  |  |
|  | Ge | 32 |  |  |  | 2 | 2 | 0 | 0 |  |  |  |  |  |  |  |  |
|  | As | 33 |  |  |  | 2 | 3 | 0 | 0 |  |  |  |  |  |  |  |  |
|  | Se | 34 |  |  |  | 2 | 4 | 0 | 0 |  |  |  |  |  |  |  |  |

According to embodiments of the present invention, a doped glass host, such as described above, may be arranged in the form of glass fibers. Herein, such glass fibers are referred to as "doped p fibers." The doped p fibers can be used in series or in parallel in a laser in order to expand a spectral emission of the laser. The doped p fibers may also use various emission wavelengths to excite samples. According to embodiments of the present invention, the doped p fibers may be arranged in such a manner as to facilitate wavelength division multiplexing.

The doped p fibers can be arranged in the form of single mode, step index, or microstructure Photonic Crystal Fibers (PCF) in order to adjust and compensate for included materials, and further to achieve fiber dispersion for laser emissions in a range from about 1100 nm to 1600 nm, for example.

The microstructure PCFs are also referred to as microstructure fibers or holey fibers. Microstructure PCFs including doped p fibers according to embodiments of the present invention may be fabricated and assembled in a manner suitable to transport optical energy and generate nonlinear effects such as supercontimuum.

A p-laser fiber region including the doped p fibers may occupy a core region of the microstructure PCF in order to compensate for dispersion of tunable NIR emissions. The p-dopant fibers can be formed in step index of refraction index or microstructure form. The compensation of a waveguide/fiber dispersion Dw, ranging from about 1100 nm to about 1400 to 1700 nm, may be minimized by using a dispersion fiber for dispersion compensation of a material dispersion Dm. A dispersion fiber may be any fiber used for adding a positive or negative dispersion to the p fibers according to embodiments of the present invention. Dispersion fibers may be arranged in series with the p fibers, and may be coupled to the p fibers through optical coupling. By placing the dispersion fiber in series with the p fibers, dispersion compensation occurs over two dispersion parts, for controlling dispersion within a particular bandwidth range, such as from about 1100 nm to about 1700 nm, for example. The total dispersion $D_T$ is given by Equation (1), as follows:

$$D_T = Dm + Dw \qquad (1)$$

The zero dispersion region (Dm=0) for silica ($SiO_2$) and germanate ($GeO_2$) fibers operate within a range of about 1300 nm to about 1500 nm. The step index dispersion for wavelengths from about 1100 nm to 1600 nm, is Dw ~10 ps/km·nm.

Figure 4:
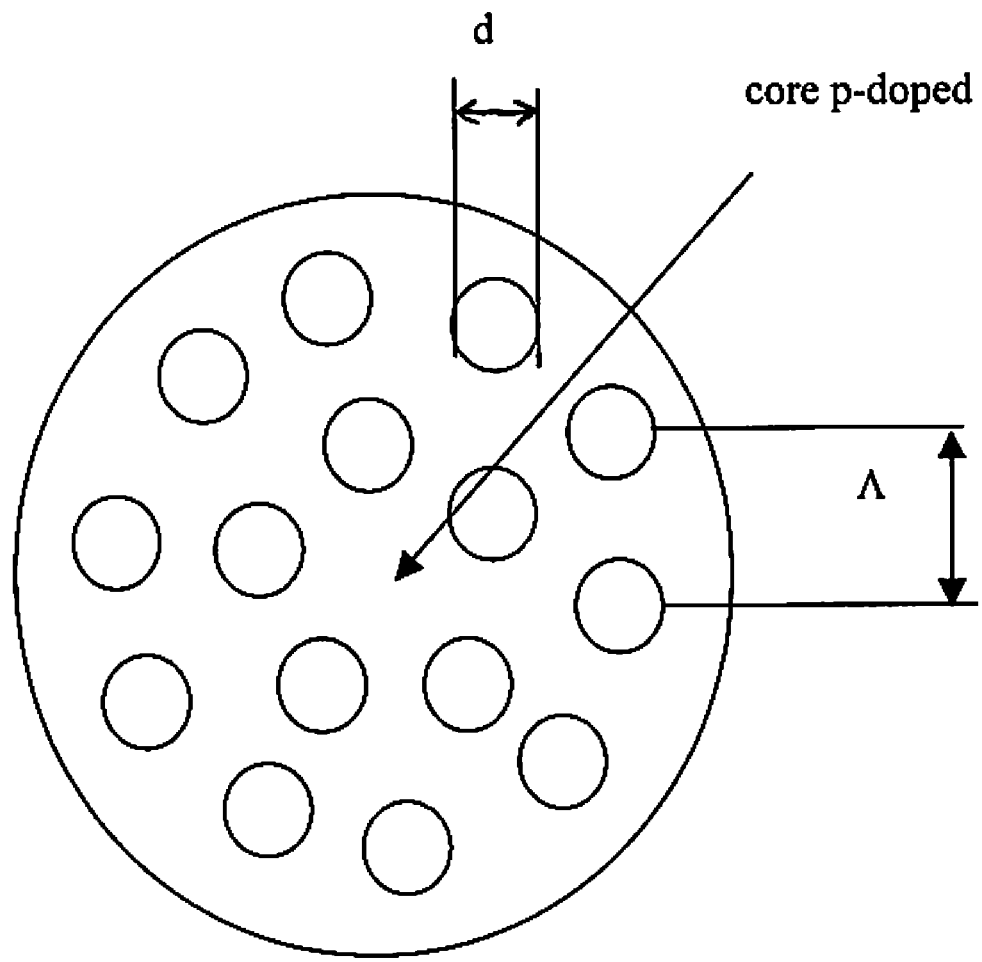
FIG. 4 is a diagram illustrating a distribution of air holes within a Photonic Crystal Fiber (PCF) according to an embodiment of the present invention.

FIG. 4 is a diagram illustrating a distribution of air holes within a Photonic Crystal Fiber (PCF) according to an embodiment of the present invention.

Referring to FIG. 4, the waveguide/fiber dispersion Dw for the PCF can be greatly varied by including air holes having a diameter d, such that adjacent air holes are spaced by a $\Lambda$, which represents a distance from a center of one air hole to a center of an adjacent air hole. Variation of d and $\Lambda$ can increase/decrease Dw for the PCF. Various d and $\Lambda$ values, such as d=0.8 μm and $\Lambda$=2 μm, may be used in accordance with embodiments of the present invention. However, embodiments of the present invention are not limited to these values.

In one example according to an embodiment of the present invention, the core diameter $d_{core}$ is set according to the d and $\Lambda$ values. More specifically, in the present example, $d_{core} = 2\Lambda - d$ is for the p-doped region.

The air holes can be arranged in square, triangular or circular arrangements. These variations in arrangement can result in changing Dw for the PCF. Further, one or more rods (e.g., about 2 to 10) can be used as a dopant p-core for laser action in the PCF. Adjustments to the air-hole distance (d) and lattice hole-hole spacing ($\Lambda$), for the zero dispersion region may be calculated and tuned for emissions within the NIR spectrum.

Figure 5:
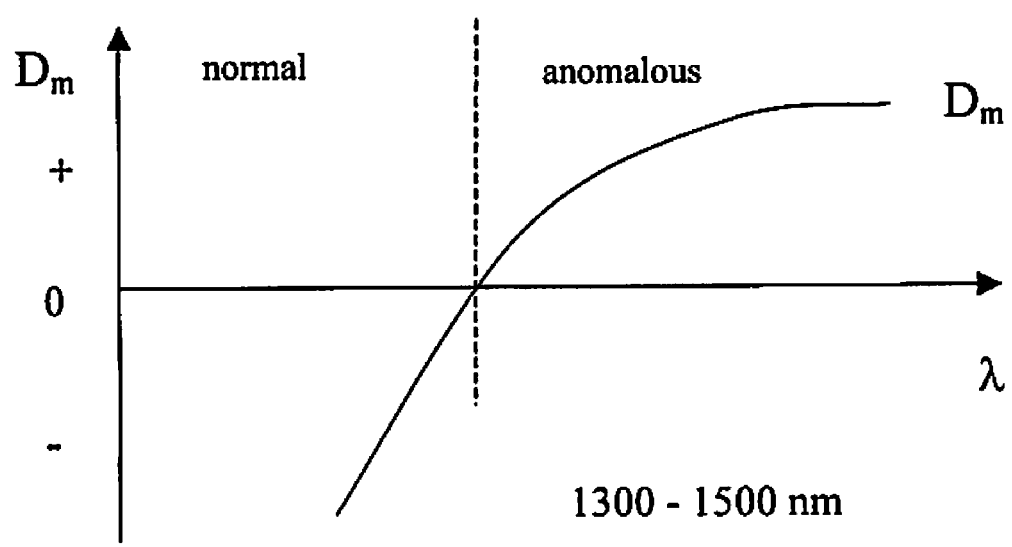
FIGS. 5 and 6 are diagrams illustrating an example of material dispersion Dm and waveguide/fiber dispersion Dw of silicate and germanate glass hosts using doped p fibers according to an embodiment of the present invention.
Figure 6:
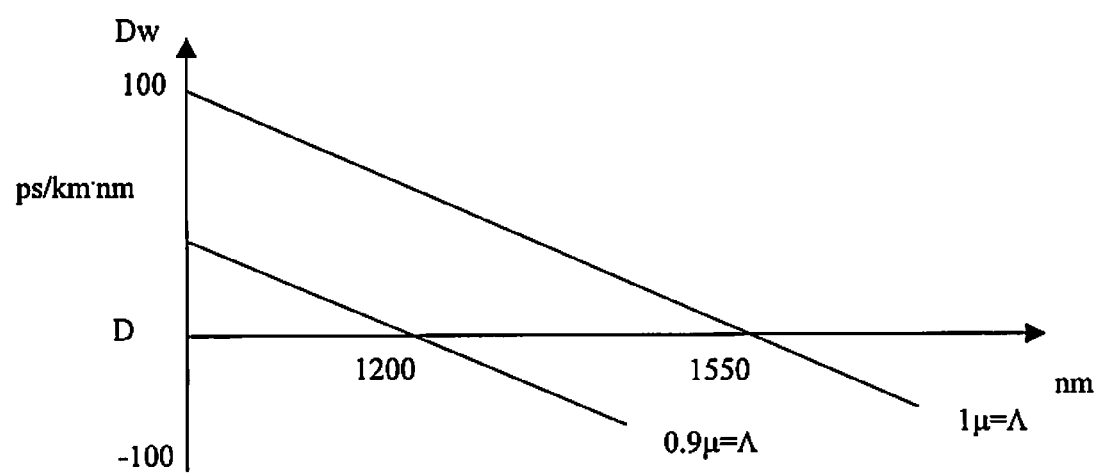

FIGS. 5 and 6 are diagrams illustrating an example of material dispersion Dm and waveguide/fiber dispersion Dw of silicate and germanate glass hosts using doped p fibers according to an embodiment of the present invention.

Referring to FIG. 5, the Dm (+) region exhibits anomalous dispersion, while the Dm (−) region exhibits normal dispersion. The dispersion for Dw in 1100 nm to 1600 nm for PCF can be changed using $\Lambda$=0.6 to 2 μm. In the example according to FIGS. 5 and 6, d=0.9 μm and $\Lambda$=1 μm.

Figure 7:
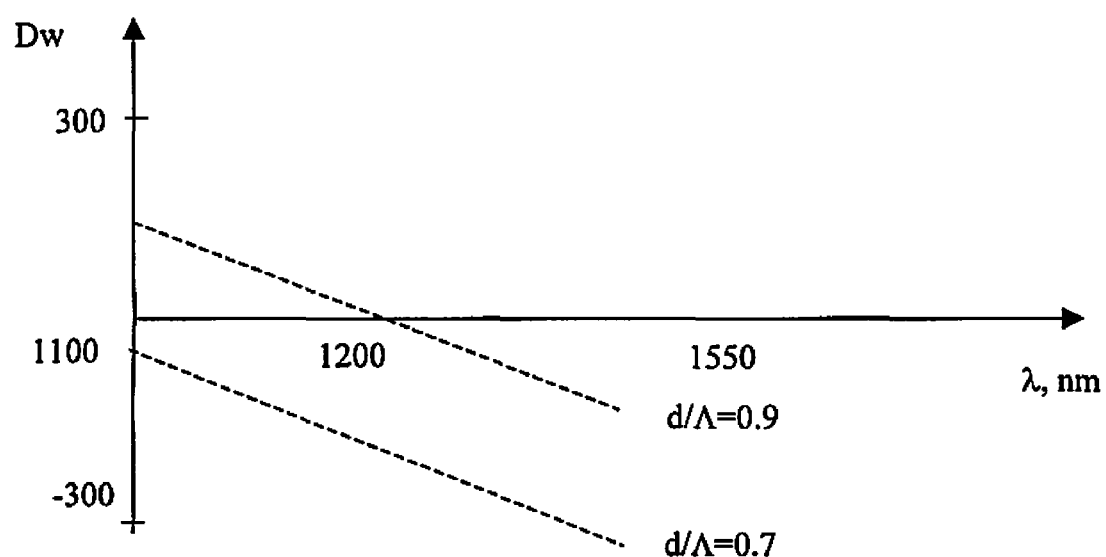
FIG. 7 is a diagram illustrating another example of waveguide/fiber dispersion Dw of silicate and germanate glass hosts using doped p fibers according to an embodiment of the present invention.

FIG. 7 is a diagram illustrating another example of waveguide/fiber dispersion Dw of silicate and germanate glass hosts using doped p fibers according to an embodiment of the present invention, is shown.

Referring to FIG. 7, the waveguide/fiber dispersion Dw for a PCF, where d/$\Lambda$=0.7 to 0.9, and where $\Lambda$=1 μM.

Figure 8:
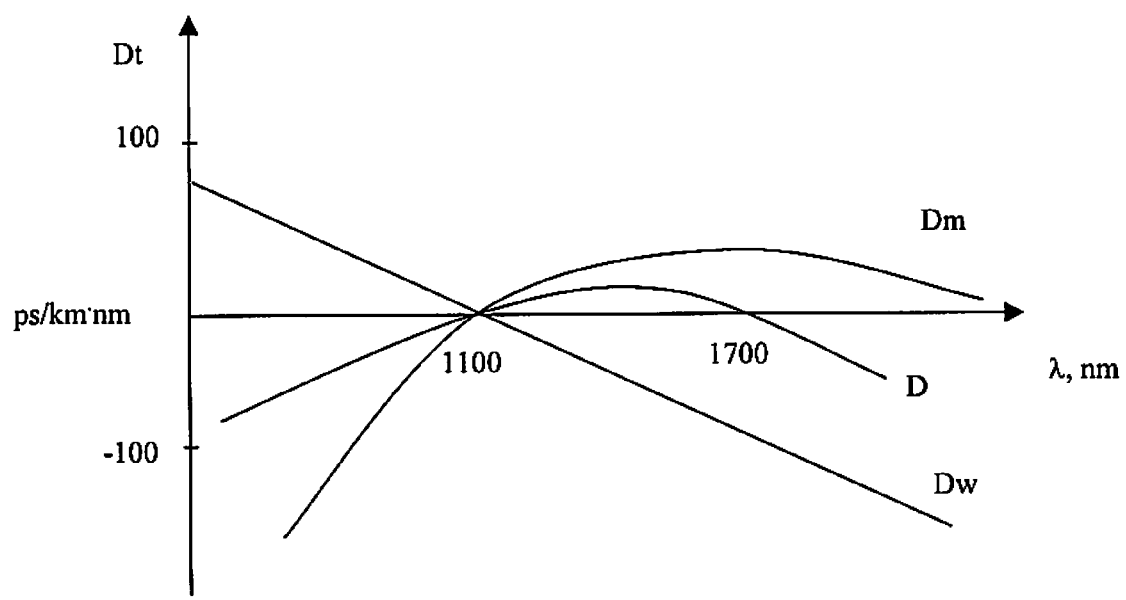
FIG. 8 is a diagram illustrating an example of waveguide/fiber dispersion Dw, material dispersion Dm, and overall dispersion $D_T$ of silicate and germanate glass hosts using doped p fibers according to an embodiment of the present invention.

FIG. 8 is a diagram illustrating an example of waveguide/fiber dispersion Dw, material dispersion Dm, and overall dispersion $D_T$ of silicate and germanate glass hosts using doped p fibers according to an embodiment of the present invention.

Referring to FIG. 8, according to an embodiment of the present invention, a combination of both Dm and Dw dispersion is adjusted in order to compensate for the dispersion of the emission wavelength, in order for emitted light to travel across all wavelengths together in the core, with only minimum spreading of the wavelength that is amplified in a laser using the PCF.

Figure 9:
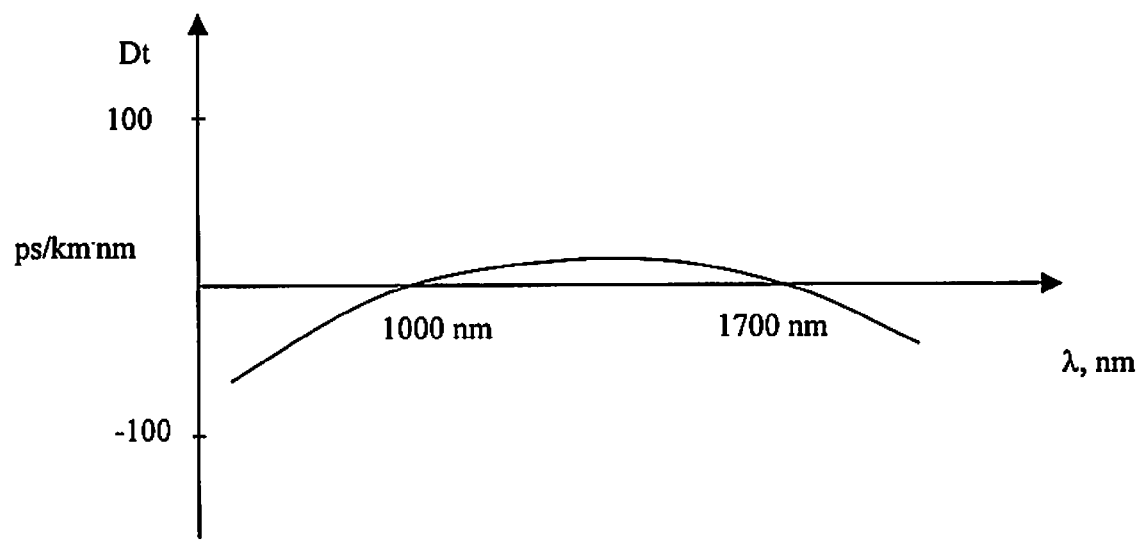
FIG. 9 is a diagram illustrating an example of dispersion of a silicate glass host using doped p fibers according to an embodiment of the present invention.

FIG. 9 is a diagram illustrating an example of dispersion of a silicate glass host using doped p fibers according to an embodiment of the present invention.

Referring to FIG. 9, a typical PCF dispersion is shown according to an embodiment of the present invention for p-laser operation using PCF with a silica glass host in a range of about 1100 nm to 1700 nm, with a typical dispersion $D_T$ of about 25 ps/km·nm. The dispersion properties $D_T$ for the PCF vary according to d and $\Lambda$. In the present example of a dispersion $D_T$ according to FIG. 9, d/$\lambda$=0.4 and $\Lambda$=2 μm.

According to embodiments of the present invention, a glass host may include a 3p component (i.e., at least one 3p element) having a concentration of about 5 mole percent to about 10 mole percent, at least one of a 6p component having a concentration of about 1 mole percent to about 5 mole percent and a 5p component having a concentration of about 1 mole percent to about 5 mole percent. The glass host composition may be further doped with at least one 4p component having a concentration of about 1 mode percent to about 5 mole percent. However, these ranges are merely provided as examples, and other concentrations may be utilized according to embodiments of the present invention.

Further, a glass host composition according to an embodiment of the present invention may be used in a medium 120 of a laser apparatus 100 such as illustrated in FIG. 1 of the present application. Also, in an alternative embodiment of the present invention, Bragg reflection tips in fibers may be used in place of mirrors in the laser apparatus. The laser apparatus may further include a Fabry-Perot etalon (not shown) for tuning the laser to an emission wavelength band ranging from about 1000 nm to about 1600 nm. According to embodiments of the present invention, the pump 110 may perform collinear end pumping within a range from about 600 nm to about 1000 nm to achieve a laser action. Further, the pump 110 may include at least one of Ti, YAG, and diode lasers for pumping the at least one fiber from an end of the at least one fiber or for transverse pumping the at least one fiber through use of an outside fiber. A fiber used for transverse pumping may be a fiber/coating surrounding a p fiber, such that the fiber to transverse pumping has a low-refractive-index relative to the p fiber. However, the present invention is not limited to only this type of laser apparatus, and other laser apparatuses may be used in accordance with other embodiments of the present invention.

While the preferred embodiment of the present invention has been illustrated and described in detail, various modifications of, for example, components, materials and parameters, will become apparent to those skilled in the art, and all such modifications and changes are intended to fall within the scope of the claims of the present invention.

What is claimed is:

1. A glass composition for use as a laser medium, the glass composition comprising:
   a host glass;
   a 3p component having a concentration of about 5 mole percent to about 10 mole percent; and
   at least one of a 6p component having a concentration of about 1 mole percent to about 5 mole percent and a 5p component having a concentration of about 1 mole percent to about 5 mole percent.

2. The glass composition of claim 1, wherein the at least one 6p component includes at least one of Tl, Pb, Bi, and Po.

3. The glass composition of claim 1, wherein the at least one 5p component includes at least one of In, Sb, Sn, I, and Te.

4. The glass composition of claim 1, wherein the at least one 3p component includes at least one of Al, Si, and P.

5. The glass composition of claim 1, further comprising:
   at least one 4p component having a concentration of about 1 mole percent to about 5 mole percent.

6. The glass composition of claim 1, wherein the at least one 4p component includes at least one of Ga, Ge, As, and Se.

7. The glass composition of claim 1, wherein when the glass composition is included in a laser medium, the glass composition enables a bandwidth of about 1100 nm to about 1600 nm.

8. The glass composition of claim 1, wherein the host glass comprises at least one of a silicate, germinate, and phosphate host glass.

9. The glass composition of claim 1, wherein the 3p component includes Al.

10. A laser apparatus comprising:
    a laser medium comprising a glass composition including a host glass, a 3p component having a concentration of about 5 mole percent to about 10 mole percent, and at least one of a 6p component having a concentration of about 1 mole percent to about 5 mole percent and a 5p component having a concentration of about 1 mole percent to about 5 mole percent;
    optical means for exciting the laser medium to emit optical radiation; and
    an optical resonant cavity for supporting coherent radiation emitted by the laser medium.

11. The laser apparatus of claim 10, wherein the glass composition is arranged in the form of at least one glass fiber, wherein each of the at least one glass fiber includes a same or different combination of the 3p, 5p, and 6p components.

12. The laser apparatus of claim 11, wherein the at least one glass fiber is included in a laser cavity including mirrors or Bragg reflection in tips of fibers.

13. The laser apparatus of claim 10, wherein at least one of the 6p component and the 5p component includes a saturable absorber for generating ps and fs pulses.

14. The laser apparatus of claim 10, further comprising:
    a pump for performing collinear end pumping within a range from about 600 nm to about 1000 nm to achieve a laser action.

15. The laser apparatus of claim 10, further comprising:
    at least one of Ti, Yttrium Aluminum Garnet (YAG), and diode lasers for pumping the at least one fiber from an end of the at least one fiber or for transverse pumping the at least one fiber through use of an outside fiber.

16. The laser apparatus of claim 11, further comprising:
    a low-refractive-index fiber surrounding the at least one fiber for transverse pumping the at least one fiber.

17. The laser apparatus of claim 11, wherein the at least one fiber includes a plurality of fibers arranged in series.

18. The laser apparatus of claim 11, wherein the at least one fiber includes a plurality of fibers arranged in parallel.

19. The laser apparatus of claim 11, wherein the at least one fiber is configured for wavelength division multiplexing.

20. The laser apparatus of claim 11, wherein the at least one fiber is arranged within a microstructure doped fiber core, such that each of a plurality of air holes running lengthwise through the microstructure doped fiber core has a diameter of about 0.8 μm, and such that a distance between centers of adjacent air holes is about 2 μm.

21. The laser apparatus of claim 10, further comprising:
    a dispersion fiber for performing dispersion compensation of two dispersion parts over a bandwidth range of about 1100 nm to about 1700 nm.

22. The laser apparatus of claim 10, wherein the 3p component includes Al.

* * * * *